United States Patent
Hanano

(10) Patent No.: US 7,350,924 B2
(45) Date of Patent: Apr. 1, 2008

(54) ILLUMINATION APPARATUS AND IMAGE PROJECTION APPARATUS USING THE ILLUMINATION APPARATUS

(75) Inventor: Kazunari Hanano, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/638,082

(22) Filed: Dec. 13, 2006

(65) Prior Publication Data

US 2007/0091271 A1 Apr. 26, 2007

Related U.S. Application Data

(62) Division of application No. 10/657,978, filed on Sep. 9, 2003, now Pat. No. 7,185,985.

(30) Foreign Application Priority Data

Sep. 12, 2002 (JP) ............... 2002-266861

(51) Int. Cl.
*G03B 21/26* (2006.01)
*G03B 21/20* (2006.01)
*F21V 7/04* (2006.01)
(52) U.S. Cl. ............ 353/30; 353/34; 353/94; 353/102; 362/558
(58) Field of Classification Search ........... 353/20, 353/30, 31, 34, 102; 362/558
See application file for complete search history.

(56) References Cited

U.S. PATENT DOCUMENTS

| | | | |
|---|---|---|---|
| 5,752,766 A | 5/1998 | Bailey et al. | |
| 5,923,475 A | 7/1999 | Kurtz et al. | |
| 6,129,437 A | 10/2000 | Koga et al. | |
| 6,139,156 A | 10/2000 | Okamori et al. | |
| 6,224,216 B1 | 5/2001 | Parker et al. | |
| 6,227,669 B1 | 5/2001 | Tiao et al. | |
| 6,318,863 B1 | 11/2001 | Tiao et al. | |
| 6,591,022 B2 * | 7/2003 | Dewald | 382/274 |
| 6,916,097 B2 | 7/2005 | Omoda et al. | |

FOREIGN PATENT DOCUMENTS

| | | |
|---|---|---|
| JP | 02257191 | 10/1990 |
| JP | 02257193 | 10/1990 |
| JP | 9-43562 | 2/1997 |
| JP | 09-325417 | 12/1997 |
| JP | 11-032278 | 2/1999 |
| JP | 11-282092 | 1/2000 |
| JP | 2000-089684 | 3/2000 |
| JP | 3048353 | 3/2000 |
| JP | 2000-206455 | 7/2000 |

* cited by examiner

*Primary Examiner*—Melissa Jan Koval
(74) *Attorney, Agent, or Firm*—Volpe & Koenig P.C.

(57) ABSTRACT

An illumination apparatus comprises a small-plane light source having diffusion radiation characteristics, a columnar light leading member, having an incident end surface, an outgoing radiation end surface and a reflection surface, configured to reflect on the reflection surface, at least a part of a light ray from small-plane light source collected from the incident end surface, thereby leading the light to the outgoing radiation end surface, and an angle position converting member configured to convert an outgoing light angle intensity of the outgoing light from the outgoing radiation end surface of the columnar light leading member into a position intensity in a predetermined irradiation area.

10 Claims, 11 Drawing Sheets

| Taper rod | 13A | 13B | 13C | 13D |
|---|---|---|---|---|
| Inlet size (X direction × Y direction) | 1.5×1.5 | 3.0×3.0 | 1.5×1.5 | 1.5×3.0 |
| Outlet size (X direction × Y direction) | 4.2×4.2 | 8.4×8.4 | 4.2×8.4 | 4.2×8.4 |
| Length | 35 | 35 | 35 | 35 |
| Chip size | 1×1 | 1×1 | 1×1 | 1×1 |
| Gap | 0.5 | 0.5 | 0.5 | 0.5 |
FIG. 12
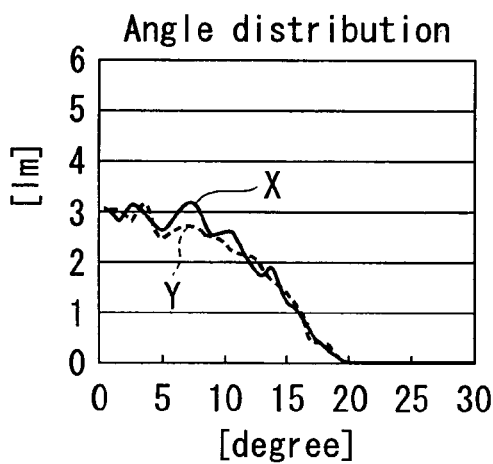
FIG. 13A
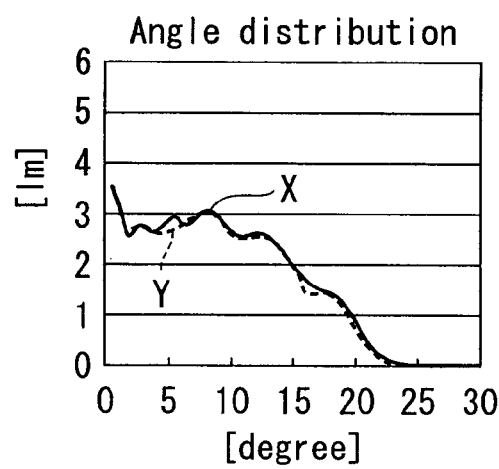
FIG. 13B
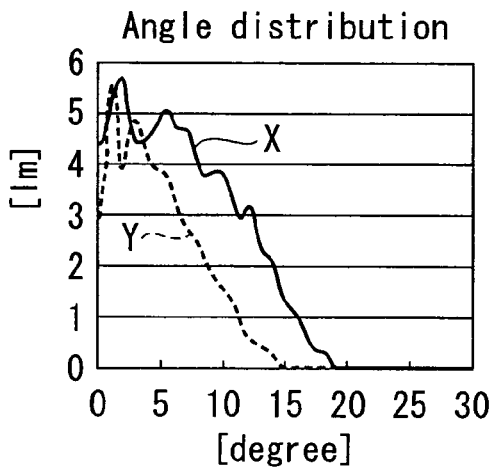
FIG. 13C
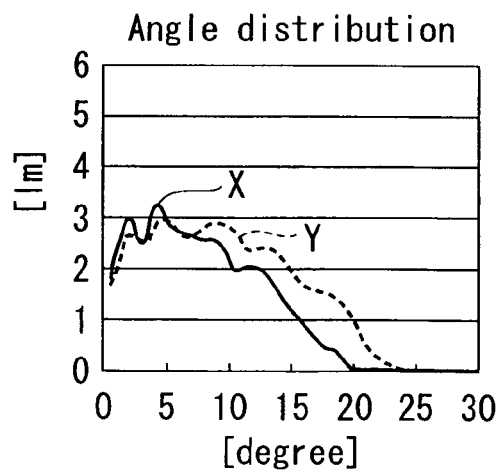
FIG. 13D

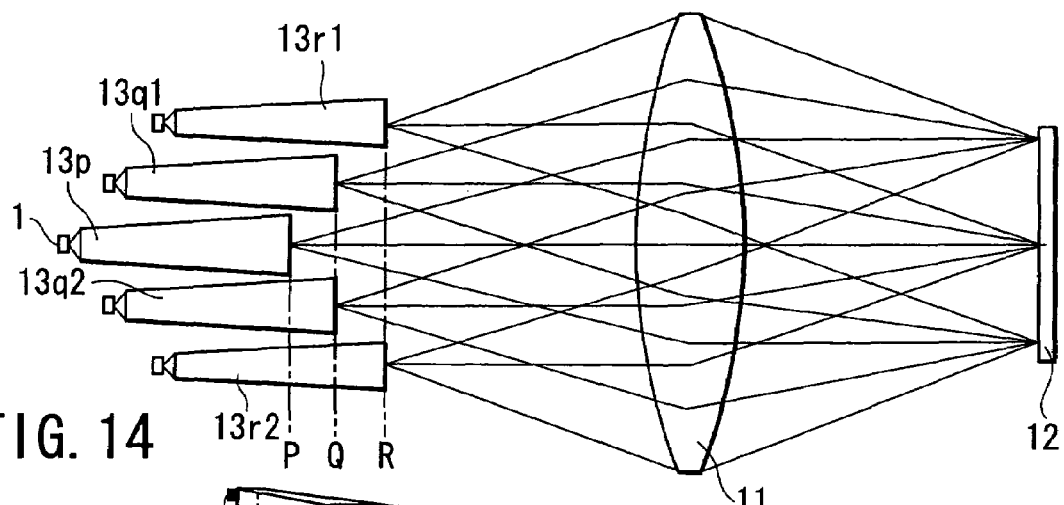
FIG. 14
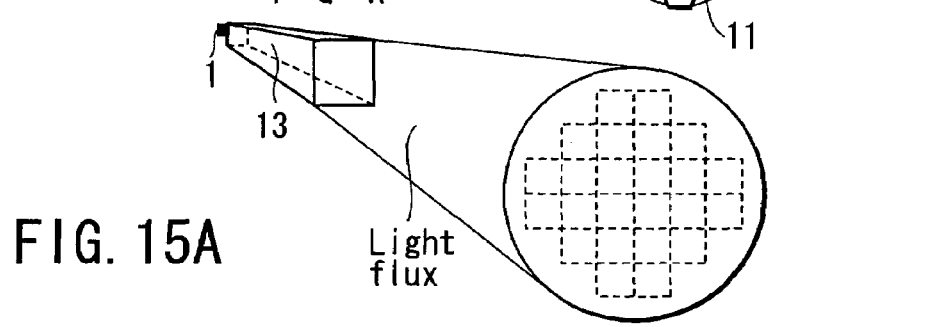
FIG. 15A
FIG. 15B
Angle intensity distribution graph
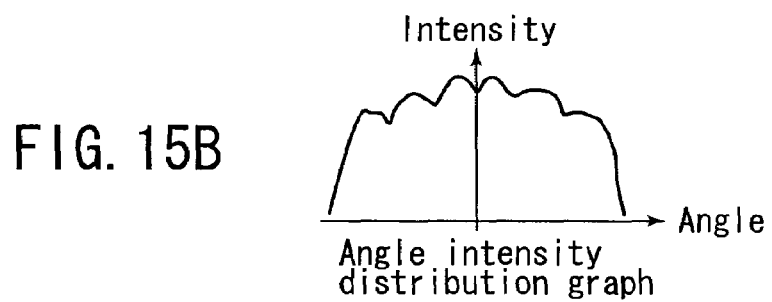
FIG. 16A
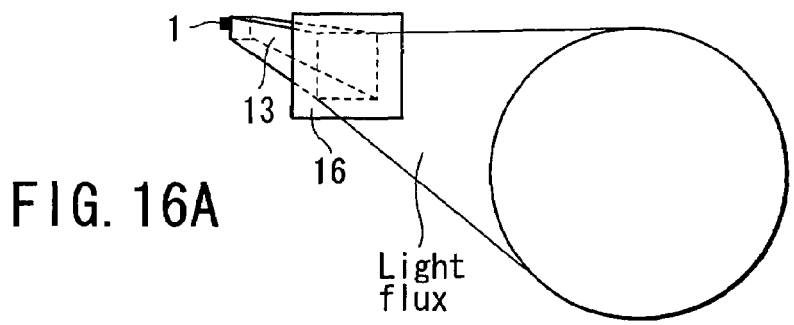
FIG. 16B
Angle intensity distribution graph

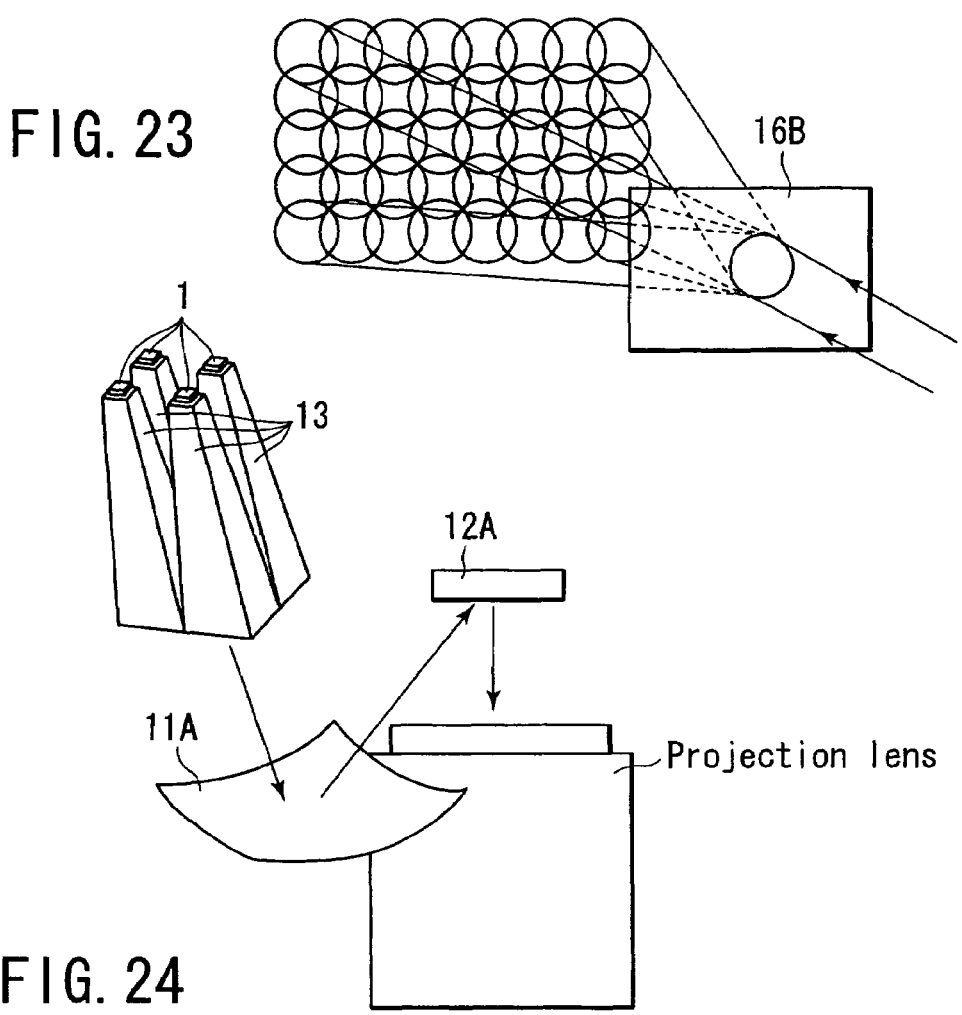
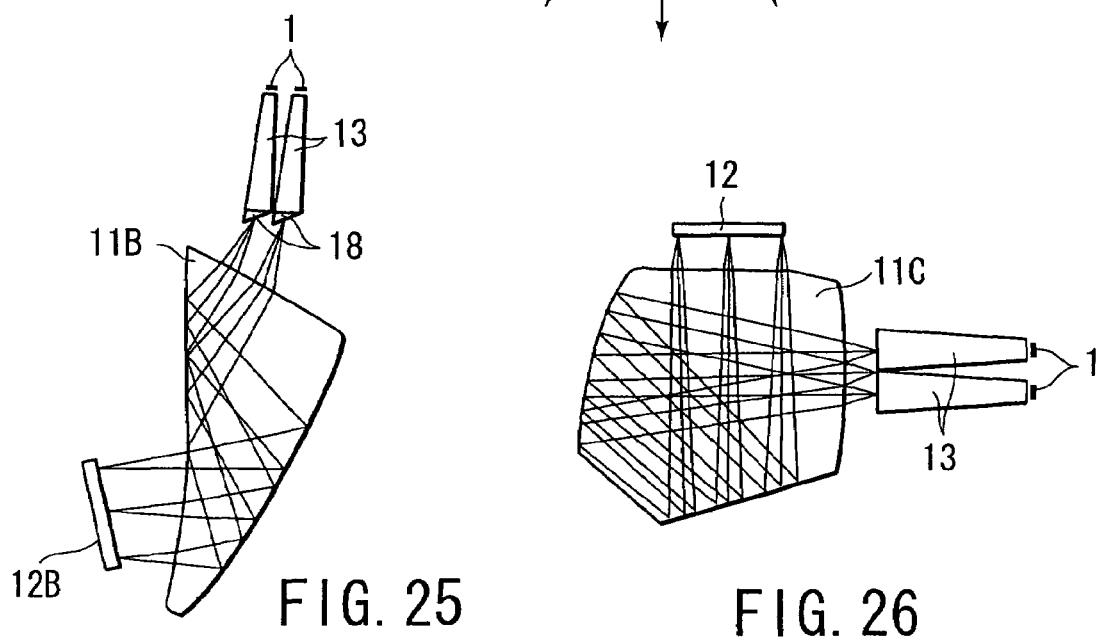
FIG. 23
FIG. 24
FIG. 25
FIG. 26

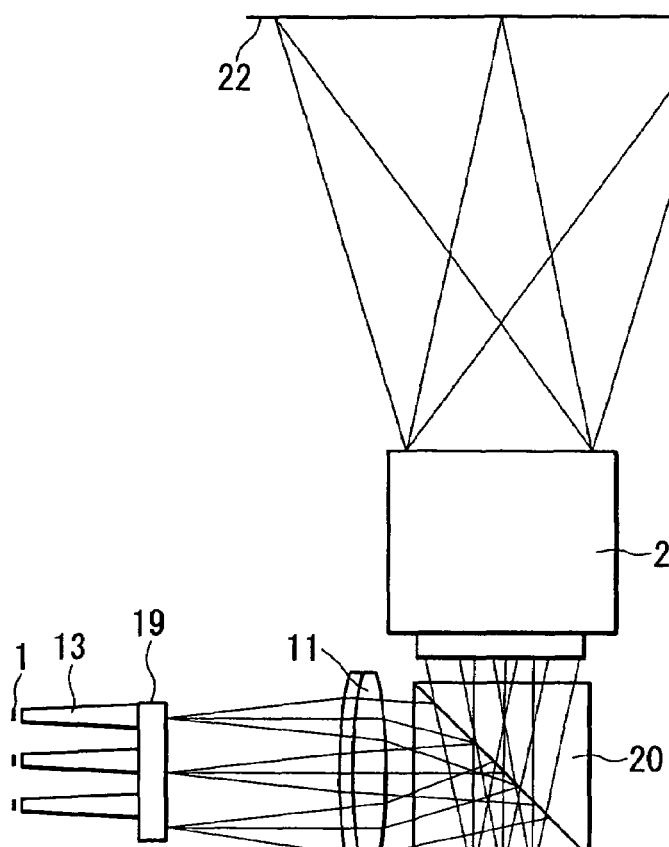
FIG. 27
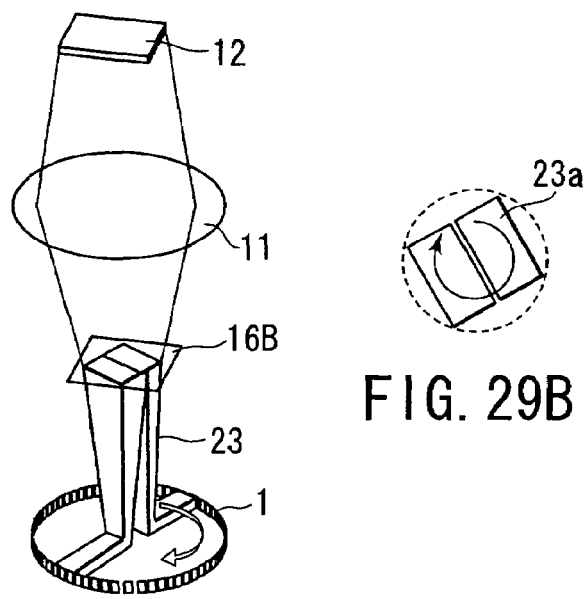
FIG. 29A
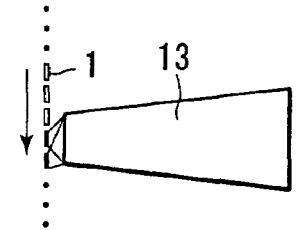
FIG. 28A
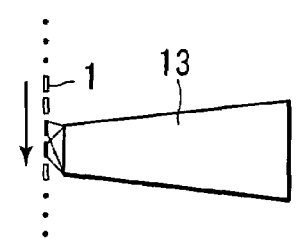
FIG. 28B
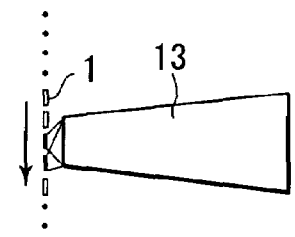
FIG. 28C
FIG. 29B
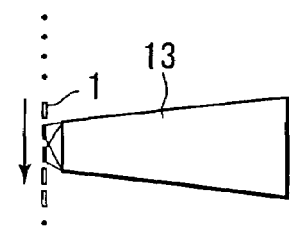
FIG. 28D

ILLUMINATION APPARATUS AND IMAGE PROJECTION APPARATUS USING THE ILLUMINATION APPARATUS

CROSS REFERENCE TO RELATED APPLICATIONS

This application is based upon and claims the benefit of priority from the prior Japanese Patent Application No. 2002-266821, filed Sep. 12, 2002 and from U.S. application Ser. No. 10/158,327, filed May 29, 2002, the entire contents of which are incorporated herein by reference.

1. Field of Invention

The present invention relates to a portable illumination apparatus which as the high brightness and realizes uniform illumination, and an image projection apparatus using the illumination apparatus.

2. Description of Related Art

As a light source in an illumination apparatus for use in an image projection apparatus such as a video projector, a discharge type bulb lamp light source is generally used in combination with a parabolic reflector or an ellipsoid reflector. However, in the bulb lamp light source, since a lamp bulb itself or an electrode forms a shadow, an unevenness of radiation distribution is generated and there occurs a so-called "reduced dark spot". Further, it has radiation relatively narrow (non-flat) distribution. Therefore, in such discharge type lamp, when Koehler illumination is carried out, the "reduced dark spot" is generated at the center, or shading at the circumference becomes prominent, which leads to lack of illuminant uniformity. Thus, an integrator such as a fly-eye lens must be usually employed, which results in a large-scale illumination apparatus.

On the contrary, a light emitting diode (which will be referred to as an LED hereinafter) has advantages such as a long duration of life, a single color luminescence, a high color reproducibility, as compared with the conventional bulb lamp light source. Furthermore, in recent years, its luminous efficiency is getting close to that of the bulb lamp, and it is expected that the LED wall exceed the bulb lamp in this regard. Thus, various kinds of image projection apparatuses such as a video projector using such an LED as a light source have been proposed.

Since this LED is a so-called diffusion (Lambertian) light source, when the LED is used as a light source in an illumination apparatus, how to efficiently condense the light and lead it to an illumination area is difficult, which must be contrived. Moreover, an LED chip is constituted by bonding an electrode to an electrode structure and an element.

Since the LED has such a chip structure and radiation angle characteristics, it can be said that it is a light source suitable for Koehler illumination. That is, critical illumination which sets the chip and an illumination object in a conjugate relationship is not suitable for an illumination apparatus since an image of the chip structure leads to lack of illuminant uniformity. On the contrary, in a Koehler illumination optical system that an angle intensity distribution of the light source becomes a position intensity distribution in an illumination area, since there is obtained an intensity distribution which is relatively flat with respect to an angle, a smooth intensity distribution can be readily acquired in an illumination area. A problem is a condensing efficiency of diffused light rays with a wide angle.

As an illumination apparatus which has such an LED as a light source and is used in an image projection apparatus, for example, Jpn. Pat. Appln. KOKAI Publication No. 11-32278 proposes an illumination apparatus which converts an outgoing light ray from an array of LEDs into a substantially parallel light ray by a condensing optical system corresponding to each LED, and converts it to a light flux diameter according to a size of a light modulation element by an afocal optical system constituted by a combination of a convex lens and a concave lens.

Additionally, U.S. Pat. No. 6,227,669 B1 proposes as an illumination apparatus of an image projection apparatus utilizing a plurality of luminous bodies as a light source, a Koehler illumination system which takes out output light rays from a plurality of LEDs by a radiation distribution lens array as a condensing optical system corresponding to each LED and superimposes the light rays from a plurality of the LEDs on a light modulation element such as an LCD by a superimposition lens.

Further, U.S. Pat. No. 6,318,863 proposes as an illumination apparatus used in an image projection apparatus utilizing LEDs as a light source, a critical illumination apparatus which converts light rays with a large angle emitted from a plurality of LEDs into light rays with a small angle by a taper rod corresponding to each LED, and then superimposes them on a light modulation element by a pair of lens arrays corresponding to each taper rod and a superimposition lens. Alternatively, this publication also proposes an illumination apparatus which converts light rays with a large angle emitted from a plurality of LEDs into light rays with a small angle by a taper rod corresponding to each LED and then evenly superimposes them on a light modulation element by a single taper rod.

Furthermore, as a fundamental principle in an optical system, a light preservation rule that a product of an area and a solid angle of a light flux is fixed before and after an optical system is well known. Generally, this product of the area and the solid angle is referred to as Etendue, and this rule is called an Etendue constant rule or a Lagrange constant rule that a product of an object (image) height and a light beam angle (NA) is constant on one plane. That is, in two-dimensional FIG. 1A, assuming that $S_1$ is an area before an optical system 9, $\Omega_1$ is a solid angle of its light flux, $S_2$ is an area after the optical system 9, and $\Omega_2$ is a solid angle of its light flux, the following expression can be obtained:

$S_1 X \Omega_1 = S_2 X \Omega_2$

Furthermore, in one-dimensional FIG. 1B, assuming that $Y_1$ is an object (image) height before the optical system 9, $NA_1$ is its light beam angle (NA), $Y_2$ is an object (image) height after the optical system 9, and $NA_2$ is its light beam angle (NA), the following expression can be archieved:

$Y_1 X\ NA_1 = Y_2 X\ NA_2$

BRIEF SUMMARY OF THE INVENTION

According to a first aspect of the present invention, there is provided an illumination apparatus comprising:

a small-plane light source having diffusion radiation characteristics;

a columnar light leading member, having an incident end surface, an outgoing radiation end surface and a reflection surface, configured to reflect on the reflection surface at least a part of a light ray form the small-plane light source collected from the incident end surface, thereby leading the light to the outgoing radiation end surface; and an angle position converting member configured to convert an outgoing light angle intensity of the outgoing light from the outgoing radiation end surface of the columnar light leading member into a position intensity in a predetermined irradiation area.

According to a second aspect of the present invention, there is a provided an image projection apparatus comprising:

an illumination apparatus comprising:
a small-plane light source having diffusion radiation characteristics;
a columnar light leading member, having an incident end surface, an outgoing radiation end surface and a reflection surface, configured to reflect on the reflection surface at least a part of a light ray from the small-plane light source collected from the incident end surface, thereby leading the light to the outgoing radiation end surface; and
an angle position converting member configured to convert an outgoing light angle intensity of the outgoing light from the outgoing radiation end surface of the columnar light leading member into a position intensity in a predetermined irradiation area;
a light modulation element, having a pixel structure, configured to modulate a light ray for each pixel in accordance with an image signal; and
a projection lens configured to enlarge and project the light modulation element, wherein
the light modulation element is arranged in the illumination area in the illumination apparatus.

According to a third aspect of the present invention, there is provided an illumination apparatus comprising;

a small-plane light source having diffusion radiation characteristics;
columnar light leading means, having an incident end surface, an outgoing radiation end surface and a reflection surface, for reflecting on the reflection surface at least a part of a light ray from the small-plane light source collected from the incident end surface, thereby leading the light to the outgoing radiation end surface; and
angle position converting means for converting an outgoing light angle intensity of the outgoing light from the outgoing radiation end surface of the columnar light leading means into a position intensity in a predetermined irradiation area.

According to a fourth aspect of the present invention, there is provided an image projection apparatus comprising:

an illumination apparatus comprising:
a small-plane light source having diffusion radiation characteristics;
columnar light leading means, having an incident end surface, an outgoing radiation end surface and a reflection surface, for reflecting on the reflection surface at least a part of a light ray from the small-plane light source collected from the incident end surface, thereby leading the light to the outgoing radiation end surface; and
angle position converting means for converting an outgoing light angle intensity of the outgoing light from the outgoing radiation end surface of the columnar light leading means into a position intensity in a predetermined irradiation area;
a light modulation element, having a pixel structure, for modulating a light ray for each pixel in accordance with an image signal; and
a projection lens for enlarging and projecting the light modulation element, wherein
the light modulation element is arranged in the illumination area in the illumination apparatus.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 is a view showing a dimension table of each angular taper rod illustrated in FIG. 11;

FIG. 13A is a view showing radiation distribution characteristics of an outgoing light ray from an outgoing radiation end surface of an angular taper rod 13A depicted in FIG. 11 when radiation angle characteristics of an LED chip are determined as Lambertian (complete diffusion);

FIG. 13B is a view showing radiation distribution characteristics of an outgoing light ray from an outgoing radiation end surface of an angular taper rod 13B likewise depicted in FIG. 11;

FIG. 13C is a view showing radiation distribution characteristics of an outgoing light ray from an outgoing radiation end surface of an angular taper rod 13C likewise depicted in FIG. 11;

FIG. 13D is a view showing radiation distribution characteristics of an outgoing light ray from an outing radiation end surface of an angular taper rod 13D likewise depicted in FIG. 11;

FIG. 14 is a view showing a structure of an illumination apparatus according to a sixth embodiment of the present invention;

FIG. 15A is perspective view of an illumination apparatus illustrating irregularities in an angle in case of an angular taper rod;

FIG. 15B is a view showing an angle intensity distribution graph in the illumination apparatus depicted in FIG. 15A;

FIG. 16A is a view showing a structure of an illumination apparatus according to a seventh embodiment of the present invention;

FIG. 16B is a view showing an angle intensity distribution graph in the illumination apparatus according to the seventh embodiment;

FIG. 23 is a view illustrating rectangular shape separation of the light flux by the light flux shape conversion diffuser;

FIG. 24 is a view showing a structure of an image projection apparatus using an illumination apparatus according to an eighth embodiment of the present invention;

FIG. 25 is a view showing a structure of an illumination apparatus according to a ninth embodiment of the present invention;

FIG. 26 is a view showing a structure of a modification of the illumination apparatus according to the ninth embodiment;

FIG. 27 is a view showing a structure of an image projection apparatus using another modification of the illumination apparatus according to the ninth embodiment;

FIG. 28A is a view illustrating an LED which emits the light at a first point in time of relative movement of a taper rod and the LED in an illumination apparatus according to a $10^{th}$ embodiment of the present invention;

FIG. 28B is a view illustrating an LED which emits the light at a second point in time;

FIG. 28C is a view illustrating an LED which emits the light at a third point in time;

FIG. 28D is a view illustrating an LED which emits the light at a fourth point in time;

FIG. 29A is a view showing a structure of an illumination apparatus according to an $11^{th}$ embodiment of the present invention;

FIG. 29B is a view illustrating a light flux shape to be emitted;

DETAILED DESCRIPTION OF THE INVENTION

Embodiments according to the present invention will now be described hereinafter with reference to the accompanying drawings.

FIRST EMBODIMENT

Figure 2:
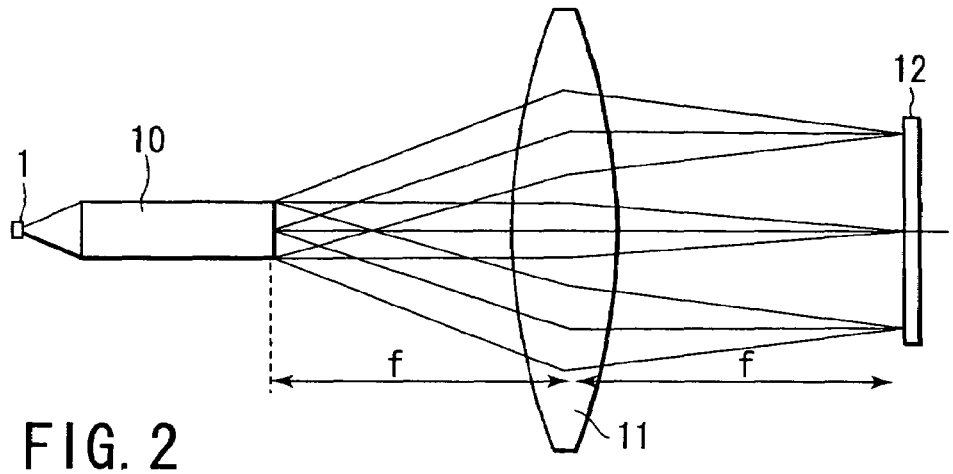
FIG. 2 is a view showing a structure of an illumination apparatus according to a first embodiment of the present invention.

As shown in FIG. 2, an illumination apparatus according to a first embodiment of the present invention is constituted by an LED 1 as a small-plane light source, a light leading rod 10 as a columnar light leading member, an illumination lens 11 as an angle position conversion member or a pupil formation member, and a light modulation element 12. Here, when the light leading rod 10 is arranged in such a manner that an outgoing radiation end surface of the light leading rod 10 is placed at a front focal position of the illumination lens ll, an optical pupil is formed in the vicinity of a focal position of the illumination lens 11. Therefore, when the light modulation element 12 is arranged at that pupil position, there can be obtained Koehler illumination which is telecentric on an image side with the outgoing radiation end surface of the light leading rod 10 being used as a virtual light source. It is to be noted that the light leading rod 10 is formed of a material of a glass or a resin which is transparent to a wavelength band of an illumination light flux, and constituted by an optical plane which is entirely mirror-finished so as to lead the light by total reflection on a side surface in terms of the efficiency.

Figure 1A:
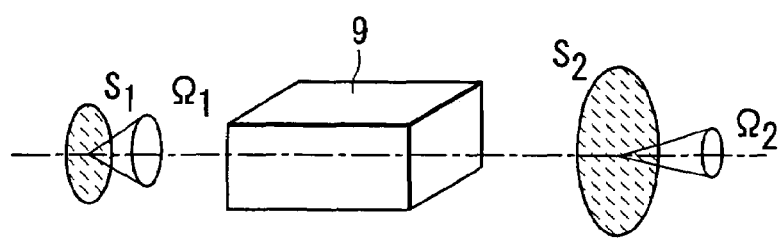
FIG. 1A is a view illustrating the light preservation rule.
Figure 1B:
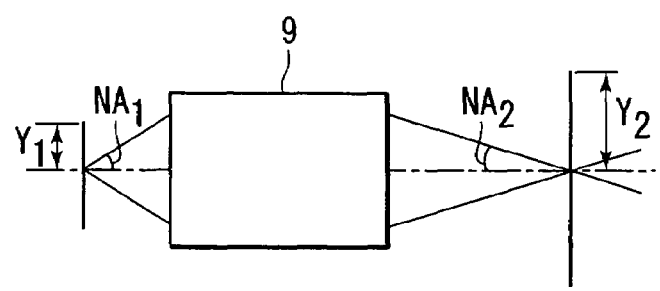
FIG. 1B is a view illustrating a light preservation rule.

Further, assuming that the light modulation element 12 is a one-inch transmission typo LCD, an allowable NA is 0.2, and an NA from the outgoing radiation end surface of the light leading rod is Sin 25°, a light leading rod cross-sectional size $\Phi$ is $\Phi=2\times25.4\times0.2/(2\times\mathrm{Sin}\ (25°))=12$ mm based on a relationship shown in FIG. 1B. Since the light beam NA does not vary depending on an input side and an output side of the light leading rod 10, when a chip of the LED 1 is distanced from an incident plane of the light leading rod 10 by 13 mm, only the light beam of not more than 25° can be taken out, and lack of illuminant uniformity can be suppressed to approximately ±10%. Furthermore, when a focal distance f of the illumination lens 11 is set to approximately 27 mm, a pupil with a diameter of 1 inch can be formed at a position which is away from a principal plane of the illumination lens 11 by approximately 27 mm, thereby realizing illumination with the good area efficiency, where the area efficiency is the ratio of effective area (for example, LCD area) to illumination area (actual illuminated area). Incidentally, it is further preferable if a condensing element has a high light collection efficiency of the light from the LED light source while collecting the low efficiency of approximately 18% into consideration because the illumination lens 11 becomes a short focus lens having an F number being approximately 1 and the light collection efficiency of the light leading rod 10 is an incident NA of 25°, where the light collection efficiency is the ratio of incidence light beams into inlet of rod to radiated light beams from light source.

As described above, since the illumination apparatus according to the first embodiment comprises apparatus the light leading rod 10 which condenses a radiant light ray from the small-plane light source such as an LED 1 and the illumination lens 11 which which forms a pupil with a predetermined size from the outgoing light from the light leading rod 10, an illumination system with a short optical length can be realized with a relatively simple structure.

Moreover, since radiation angle characteristics of the LED 1 relatively gently curve and the radiation angle characteristics are converted into unevenness of spatial distribution on a pupil when the pupil is formed by the illumination lens 11, when the pupil is determined as an irradiated area, an illumination apparatus which can perform even illumination with less illumination irregularities can be realized.

SECOND EMBODIMENT

Figure 3:
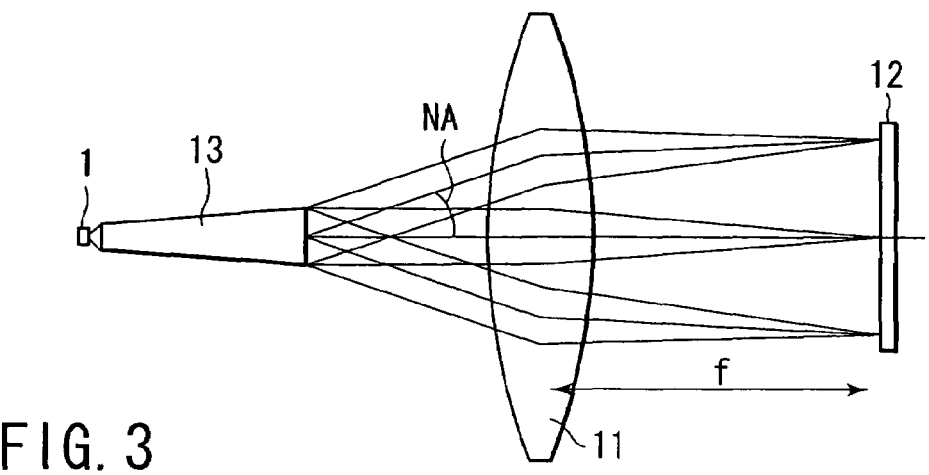
FIG. 3 is a view showing a structure of an illumination apparatus according to a second embodiment of the present invention.

A second embodiment according the present invention will now be described. As shown in FIG. 3, an illumination apparatus according to the second embodiment is constituted by an LED 1 a small-plane light source, a taper rod 13 as columnar light leading member, an illumination lens 11, and a light modulation element 12. That is, in the light leading rod 10 depicted in FIG. 2. the light collection efficiency is increased when the chip of the LED 1 is moved closer to the rod in order to improve the light collection efficiency of the rod, but the light out of the irradiated area or the light exceeding the allowable NA is obtained, which is the wasteful light after all. Thus, in the second embodiment, the taper rod 13 which is a tapered light leading rod is used, and NA conversion is performed in the taper rod 13, thereby improving the efficiency. Since the light leading rod has a tapered shape, the NA of the light flux collected to the incident end surface of the taper rod 13 among the emitted light rays from the LED 1 becomes further small and the light is emitted since the light beam with a large angle is reflected on the side surface of the taper rod 13 and converted into a small angle when outgoing from the outgoing radiation end surface of the taper rod 13. Therefore, the incident NA of the light emitted from the LED can be increased, thereby improving the efficiency. It is to be noted that a length of the light leading rod 10 is not mentioned in the first embodiment, but an angle intensity distribution of the light outgoing from the outgoing radiation end becomes further uniform as the length is longer when the light leading rod has the tapered shape as described above.

Moreover, when a focal distance of the illumination lens 11 is f, an optical pupil is formed at a focal position away from the principal plane of the illumination lens 11 to a rear stage side by f. When the outgoing radiation end surface of the taper rod 13 is arranged at a position away from the principal plane of the illumination lens 11 to a front stage side by f, the light modulation element 12 can be illuminated in the telecentric manner. When a gap between the outgoing radiation end surface of the taper rod 13 and the principal plane of the illumination lens 11 is set shorter than the focal distance f, it is possible to illuminate the light modulation element 12 at a light beam oblique angle which forms a divergence direction as getting closer to the circumference of the light modulation element 12 like this embodiment. For example, in an image projection apparatus using such an illumination apparatus, when enlarging and projecting the light modulation element 12 by using a non-illustrated projection lens, achieving matching with the projection lens at the light beam oblique angle can reduce vignetting generated in the projection lens, thereby assuring the efficiency. For example, when using a lens having a focal distance of approximately 27 mm as the illumination lens 11, which is utilized in the example of FIG. 12, the taper rod 13 can convert the light into the light with NA 0.3 provided that the taper rod 13 has an incident end surface Φ (cross-sectional size) of 1.5 mm, an outgoing radiation end surface Φ of 8.8 mm and a length of 40 mm, and 0.7-inch transmission type LCD as the light modulation element can be illuminated with the NA 0.15. At this time, a main light beam oblique angle is mated with a main light beam oblique angle of a projection lens arranged on a rear stage of that LCD.

As described above, in order to realize efficient even illumination with a desired parallelism by using a small-plane light source such as an LED 1, the illumination apparatus according to the second embodiment comprises the taper rod 13 which converts the diffused light emitted from the light source into the light having a high parallelism with the excellent condensing property, and the illumination lens 11 which forms a pupil with a predetermined size from the outgoing light from the taper rod 13. Moreover, the radiation angle characteristics of the LED 1 relatively gently curve, and using the taper rod 13 can obtain further flat radiation angle characteristics. Since forming a pupil by the illumination lens 11 can convert the radiation angle characteristics into unevenness of spatial distribution on the pupil, if the pupil is determined as an irradiated area, it is possible to realize the illumination apparatus which can perform even illumination with less illumination irregularities.

Figure 4:
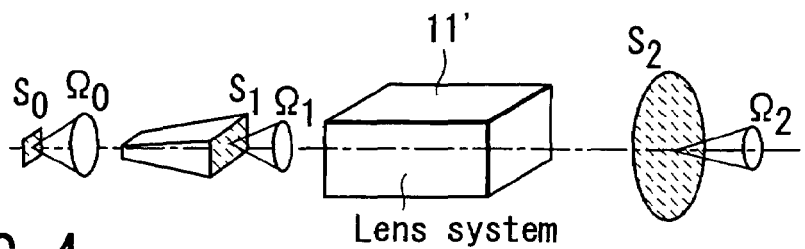
FIG. 4 is a view illustrating a light preservation rule in the illumination apparatus according to the second embodiment.

It is to be noted that a relationship of Etendue when the above-described taper rod 13 is used as shown in FIG. 4. Here, of the diffused light emitted from the LED 1, there can be achieved a preservation rule between the light which was collected by the taper rod 13, reached the outgoing radiation end surface of the taper rod 13 and has an outgoing radiation end area $S_1$ and a solid angle $\Omega_1$ and the light which was transmitted through a lens system 11' (illumination lens 11) and has an area $S_2$ and a solid angle $\Omega_2$, and a ratio of a light quantity emitted from the LED 1 and a light quantity emitted from the taper rod outgoing radiation end surface is an efficiency of light collection and light leading in the taper rod 13.

Additionally, although the taper rod 13 and the light leading rod 10 are manufactured from a material of a transparent glass or resin in a wavelength band of the illumination light flux, for example, BK7 as a general-purpose optical glass is suitable since it demonstrates characteristics of a high transmittance and low scatteration over a visible range. Further, although expensive, quartz or the like may be used in order to secure the transmittance in a short wavelength band. Furthermore, since total reflection is determined as basic, the entire surface constituting the rod must be formed into a mirror finished surface instead of a so-called roughened surfaced.

Furthermore, even if a hollow pipe structure whose inner surface is a reflection surface, i.e., a mirror pipe is used with respect to the rod formed by such a transparent optical member, it is possible to obtain functions such as desired condensing and an improvement in parallelism of a light beam. This mirror pipe is formed by processing a metal plate to obtain a rod shape or forming a metal reflection film or a dielectric multilayer film on its inner surface. Such rod type and hollow pipe type are the same in principle expect that mediums are a glass or a resin and air and refractions are different in accordance with their refractive index. However, the rod type has characteristics that it has the better efficiency because of total reflection, its number of times of reflection is larger than that of the pipe type since it is inflective, foreign particles adhere on an end surface of the rod type, it is heavier than the pipe type, and its manufacturing cost is high. In this embodiment as well as other embodiments, it is good enough to select an appropriate type in accordance with its use condition taking a high value on the efficiency or the size into consideration.

THIRD EMBODIMENT

Figure 5:
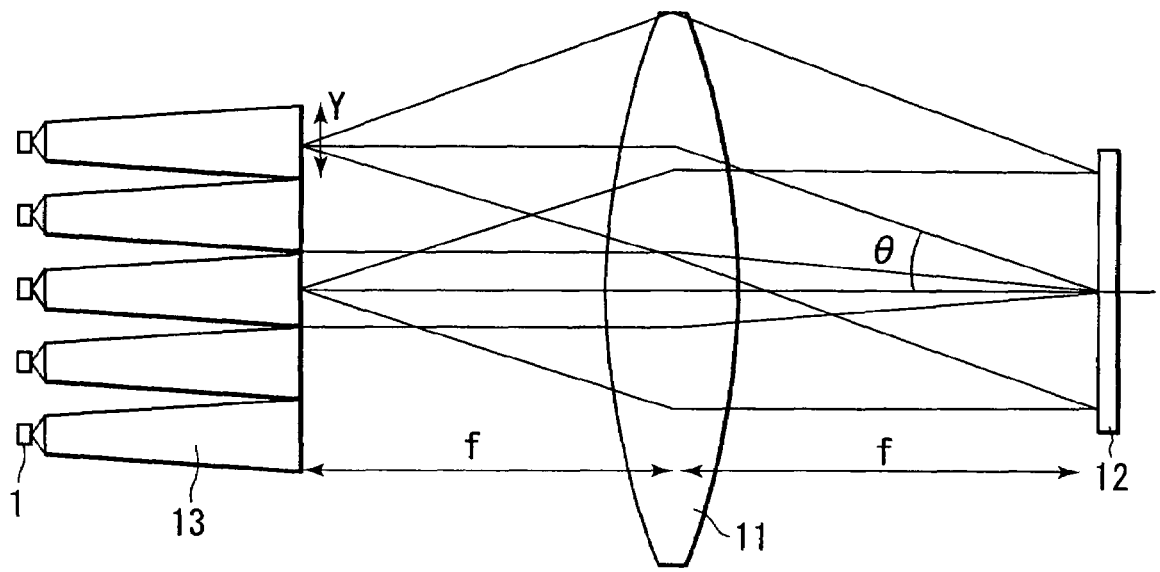
FIG. 5 is a view showing a structure of an illumination apparatus according to a third embodiment of the present invention.

A third embodiment will now be described. As shown in FIG. 5, an illumination apparatus according to the third embodiment is constituted by a plurality of pairs of the LED 1 and the taper rod 13 which are the same as those in the second embodiment. In this case, the illumination lens 11 is constituted so as to be telecentric on the image side in such a manner that each taper rod outgoing radiation end surface is placed at a position away from the principal plane of the illumination lens 11 by a distance corresponding to the focal distance f, and the taper rod 13 is arranged in parallel, thereby superimposing the light rays from the respective LEDs 1.

According to the illumination apparatus having such a structure, since a plurality of the LEDs 1 are provided, the brightness can be increased, individual differences in radiation angle characteristics of the LEDs can be averaged, and even illumination can be achieved.

FOURTH EMBODIMENT

Figure 6:
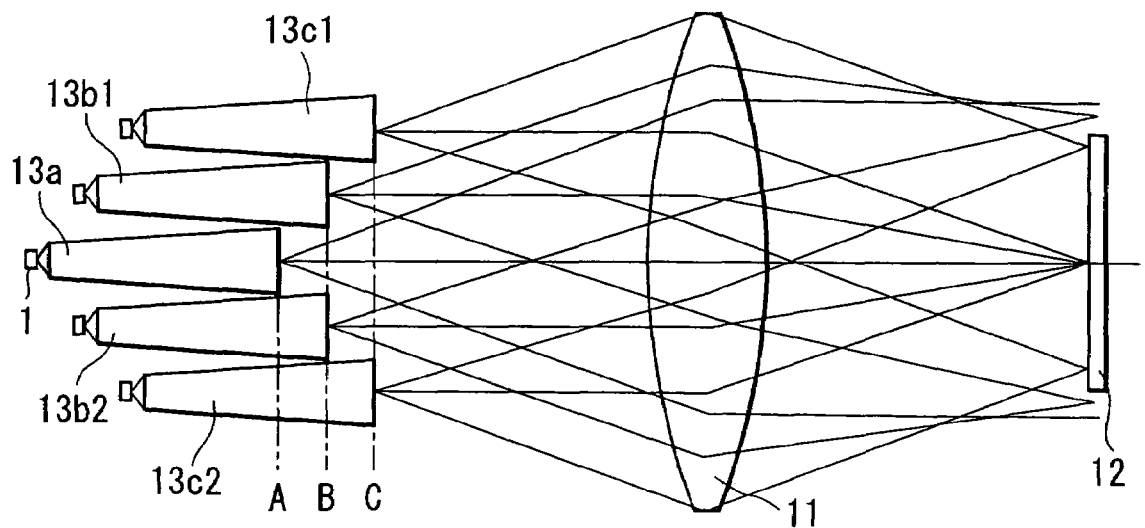
FIG. 6 is a view showing a structure of an illumination apparatus according to a fourth embodiment of the present invention.

A fourth embodiment according to the present invention will now be described. As shown in FIG. 6, an illumination apparatus according to the fourth embodiment is constituted by shifting the pairs of the LED 1 and the taper rod 13 in a direction of the optical axis of the illumination lens 11 in the structure of the third embodiment. That is, the illumination lens 11 is constituted in such a manner that light beams with an outermost angle from the taper rods $13c1$ and $13c2$ form the outermost axes of the light modulation element 12, the taper rods $13b1$ and $13b2$ are slightly shifted in a direction away form the illumination lens 11, and the taper rod $13a$ is arranged at a further distanced position.

Figure 7:
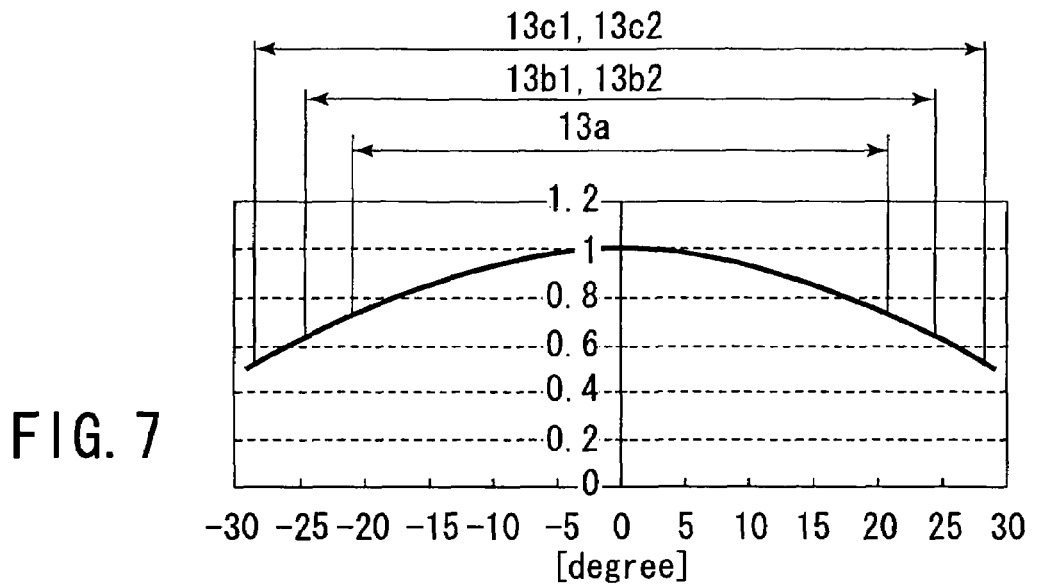
FIG. 7 is a view showing radiation distribution angle characteristics of a light flux emitted from an outgoing radiation end surface of each taper rod in the illumination apparatus according to the fourth embodiment.
Figure 8:
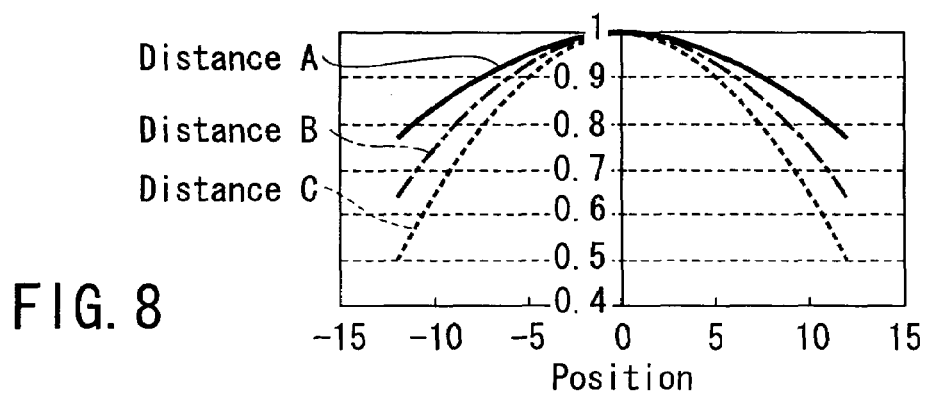
FIG. 8 is a view showing angle distribution characteristics.

The advantage of the illumination apparatus having such a structure will now be described. FIG. 7 is a view showing radiation distribution angle characteristics of a light flux emitted from the outgoing radiation end surface of each taper rod 13. As shown in the drawing, the light fluxes each having an angle within approximately ±27° are led to the light in the taper rods $13c1$ and $13c2$, but the light modulation element 12 modulation element 12 is illuminated by the light fluxes each having an angle within approximately ±24° in the taper rods $13b1$ and $13b2$ and the light flux having an angle within approximately ±20° in the taper rod $13a$. When such an arrangement is adopted, irregularities in illumination on the actual light modulation element 12 correspond to addition of the respective angle distribution characteristics of a, b and c shown in FIG. 8, and there is a merit that irregularities in illumination is averaged.

FIFTH EMBODIMENT

Figure 9A:
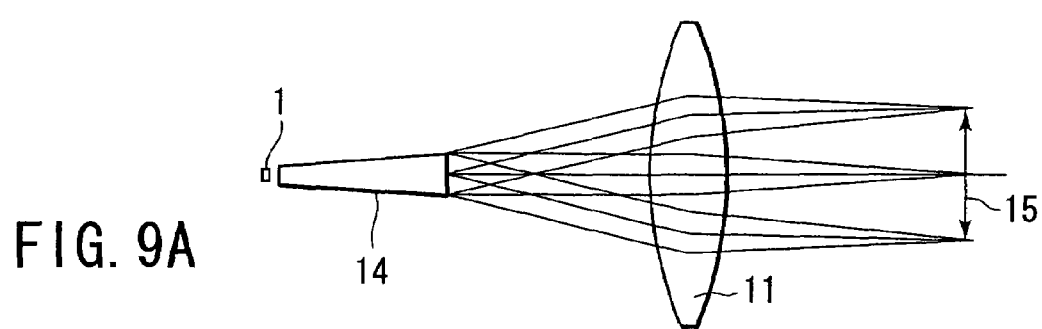
FIG. 9A is a horizontal cross-sectional view showing a structure of an illumination apparatus according to a fifth embodiment of the present invention.
Figure 9B:
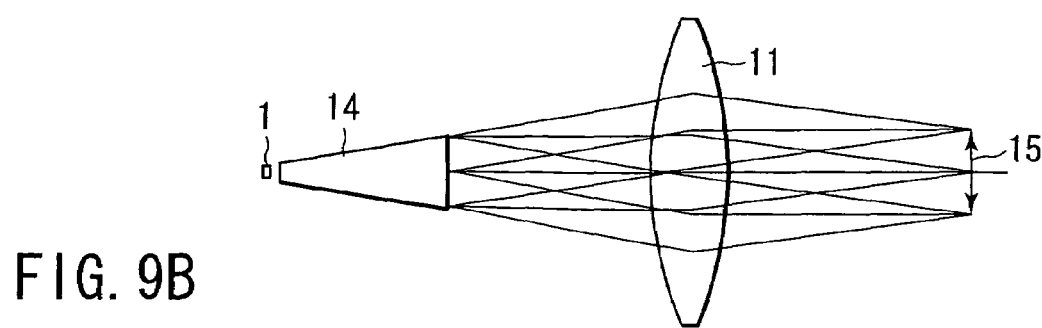
FIG. 9B is a vertical cross-sectional view showing the structure of the illumination apparatus according to the fifth embodiment.
Figure 10:
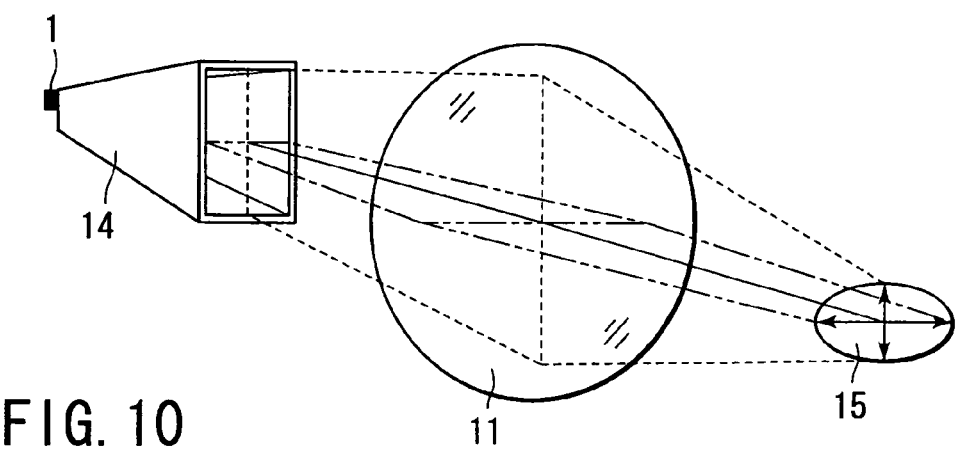
FIG. 10 is a view illustrating an optical pupil to be formed.

A fifth embodiment according to the present invention will now be described. FIGS. 9A and 9B are a horizontal cross-sectional view and a vertical cross-sectional view showing a structure of an illumination apparatus according to the fifth embodiment. The illumination apparatus according to this embodiment uses a mirror pipe 14 in place of the taper rod 13 in the second embodiment, and changes a taper degree of the mirror pipe 14 in accordance with its direction. In this manner, when a ratio in size of an incident end surface and an outgoing radiation end surface of the mirror pipe 14, i.e., an aperture ratio varies depending on the horizontal direction and the vertical direction, an NA of the outgoing light flux also varies depending on each direction. Therefore, a size of an optical pupil 15 to be formed varies depending on each direction and, as shown in FIG. 10, even if the incident end surface is square, the outgoing radiation NA in the vertical direction is smaller than the NA in the horizontal direction when the outgoing radiation end surface has a rectangular shape which is long in the vertical direction, i.e., when an aperture in the vertical direction is larger than an aperture in the horizontal direction. Therefore, the shape of the pupil 15 is an ellipse having a major axis in the horizontal direction.

By adopting such a structure, when the light modulation element 12 having an aspect which is long in the lateral direction is illuminated, causing the NA to fall within the allowable NA can increase an area efficiency of an irradiated area, thereby improving the optical efficiency.

Figure 11:
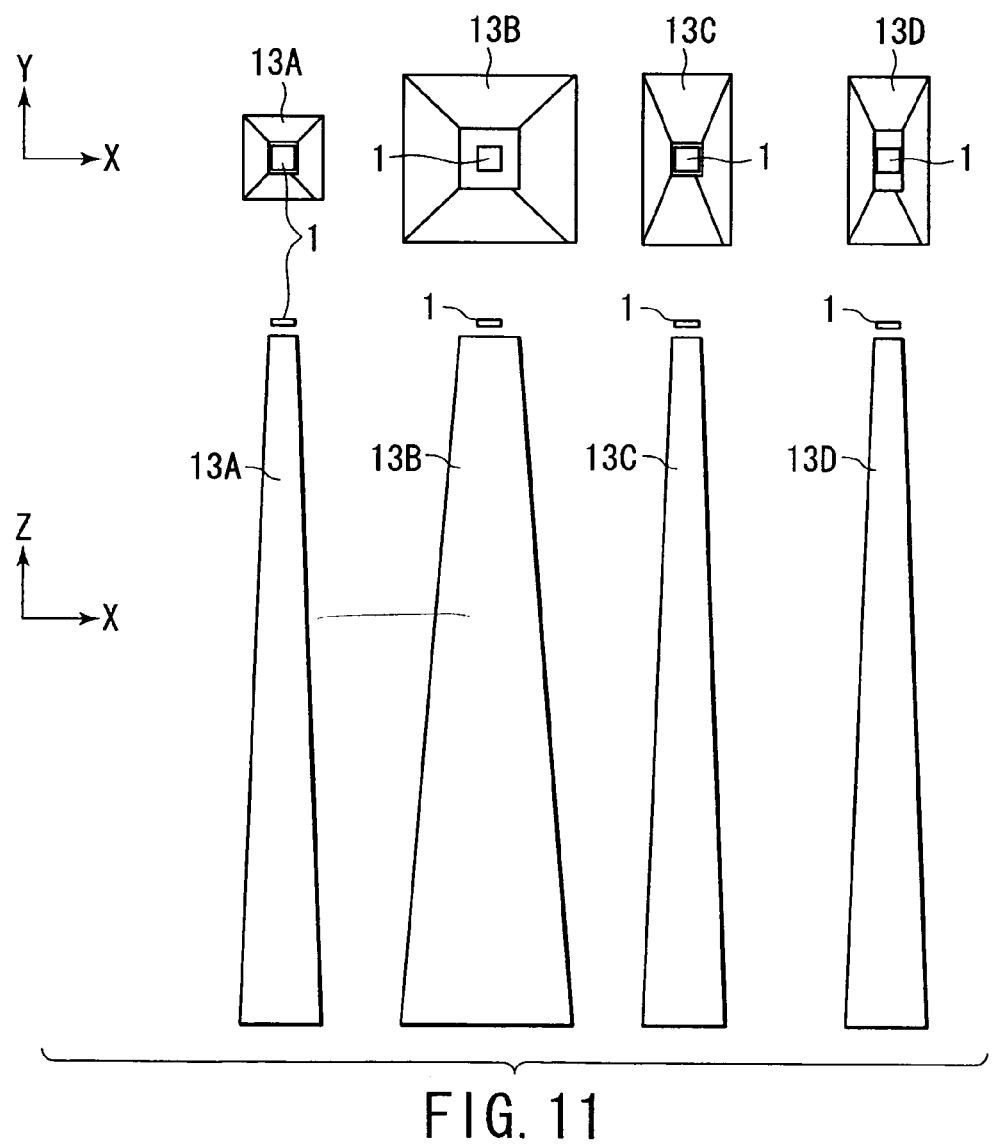
FIG. 11 is a view showing examples of an angular taper rod.

Here, in order to clarify a relationship between a shape and angle distribution characteristics of the rod or the mirror pipe each having such an aperture ratio (which will be referred to as an AR hereinafter) as shown in FIGS. 9A and 9B, or the rod or the mirror pipe each having an incident end surface shape with an aspect, angle distributions of such angular taper rods (or mirror pipes each having a taper) 13A to 13D as shown in FIG. 11 will now be examined. In regard to coordinate axes, a direction of a major axis is determined as z, a horizontal direction of a cross section is determined as a direction X and a vertical direction of the same is determined as a direction Y as shown in FIG. 11.

The dimension in this case is as shown in a table of FIG. 12. That is, with respect to a chip size 1×1 of the LED1, a gap between the LED chip and the incident end surface and a length are coordinated as 0.5 and 35, respectively. Although the taper rod 13A and the taper rod 13B have the same AR, the taper rod 13B has the sizes of the incident end surface and the outgoing radiation end surface which are twofold of those of the taper rod 13A. Each of the taper rod 13A and the taper rod 13C has the AR in one direction which is twofold of the AR in the other direction. Although the taper rod 13A and the taper rod 13D have the same AR, a diameter in one direction is twofold of a diameter in the other direction. The taper rod 13C and the taper rod 13D have the ARs which vary depending on a direction.

Further, FIGS. 13A to 13D show radiation distribution characteristics of outgoing light beams from outgoing radiation end surfaces of the respective rods when the radiation angle characteristics of the LED chip are determined as Lambertian (complete diffusion). The taper rod 13A and the taper rod 13B are compared with each other in incident end surface size. Since the AR does not vary depending on the direction, as apparent from comparison between FIGS. 13A and 13B, there is no difference in characteristics between the X (horizontal) direction and the Y (vertical direction), but the taper rod 13B has a larger aperture than that of the taper rod 13A, and hence its outgoing radiation angle is also large. That is because the incident NA is large due to a large size of the incident end surface, and the outgoing radiation NA is thereby large.

Furthermore, the taper rod 13A and the taper rod 13C are compared with each other in AR. As apparent from comparison between FIGS. 13A and 13C, the taper rod 13A and the taper rod 13C have the same outgoing radiation NA in the X direction in which the AR is the same, but the taper rod 13C having the large AR in the Y direction has the smaller outgoing radiation NA. The qualitative explanation illustrated in FIG. 10 can be applied as it is.

The taper rod 13A and the taper rod 13D are compared with each other in incident end surface size. The taper rod 13A and the taper rod 13D have the same AR in the respective directions but, as apparent from comparison between FIGS. 13A and 13D, the taper rod 13D has the larger outgoing radiation NA in the Y direction. That is because the taper rod 13A has the larger incident end surface than that of the taper rod 13D and its incident NA is thereby larger.

The taper rod 13C and the taper rod 13D are compared with each other in AR. The taper rod 13C and the taper rod 13D have a relationship that the size of the incident end surface is doubled. In regard to the AR, the taper rod 13C has 2.8 in the X direction and 5.6 in the Y direction, and the taper rod 13D has 2.8 in the X direction and 2.8 in the Y direction. As apparent from comparison between FIGS. 13C and 13D, the outgoing radiation NA in the X direction of the taper rod 13C is equal to that in the X direction of the taper rod 13D, but the taper rod 13C which has the larger AR has the smaller outgoing radiation NA in the Y direction. The outgoing radiation NA in the Y direction of the taper rod 13D which has the same AR value in the X direction is larger because the taper rod 13D has the larger incident end surface size.

To sum up, the outgoing radiation NA becomes smaller as the AR is larger, and it becomes smaller as the incident end surface size is smaller. Moreover, irregularities in angle of the outgoing radiation angle become smooth as the length is increased. The angle characteristics shown in FIGS. 13A to 13D are not illustrated in the smooth graphs, and hence angle irregularities remain. The angle irregularities can be reduced when the taper rod length is increased.

By using the taper rod (or the mirror pipe having a taper) in this manner, the light flux with the incident NA which is not less than approximately 0.8 due to the gap and the incident end surface can be converted into the light flux with the NA of approximately 0.3. Even if this is tried to be achieved by using the lens, the lens itself with the incident NA is difficult, and it is hard to provide a transition performance on the entire clip surface although an axile performance can be assured. A conversion degree of the NA of this taper rod (or the mirror pipe having a taper) depends on the above-described AR but does not depend on a so-called taper angle in a length with which a certain measure of the number of times of reflection can be assured. That is, in the graphs, of FIGS. 13A to 13D, even if the length of each taper rod (or the mirror pipe having a taper) shown in FIG. 11 is changed, only the smoothness of the graphs varies, and the maximum angle or the inclination of each graph does not greatly vary.

SIXTH EMBODIMENT

A sixth embodiment according to the present invention will now be described. An illumination apparatus according to this embodiment is obtained by modifying the fourth embodiment by utilizing a fact that the NA of the outgoing light of the taper rod 13 becomes smaller when the AR as a ratio of the incident end surface size and the outgoing radiation end surface size is large, as described in connection with the fifth embodiment.

That is, as shown in FIG. 14, in the illumination apparatus according to the sixth embodiment, a taper rod 13$p$ having the large AR and the small NA is arranged in the vicinity of the center close to the optical axis, and taper rods 13r1 and 13r2 each of which has the small AR and the large outgoing radiation NA are arranged in the vicinity of the circumference away form the optical axis.

By adopting such a structure, a wasteful area can be eliminated in the irradiation area relative to an irradiation object, and illumination irregularities can be averaged while assuring the efficiency.

SEVENTH EMBODIMENT

A seventh embodiment will now be described. Angle irregularities exist in the light emitted from the taper rod as shown in FIGS. 13A to 13D when a length of the taper rod is small. That is, as shown in FIGS. 15A and 15B, in case of the angular taper rod 13, the lattice angle irregularities are generated in the light to be emitted. When the light flux emitted from the taper rod 13 is subjected to Koehler illumination by forming a pupil, the angle irregularities directly become irregularities in illumination intensity on the irradiation object. Thus, in the illumination apparatus according to the seventh embodiment, as shown in FIG. 16A, a diffuser 16 as a light diffusion element is arranged on a rear stage of the outgoing radiation end surface of the taper rod 13. As a result, as shown in FIG. 16B, the angle irregularities can be reduced. Incidentally, at this time, if a diffuser with a very large diffusion angle is used as the diffuser 16, the light has a large angle is obtained even though the light has been converted into the light with the small NA by the taper rod 13. Therefore, the diffuser 16 with a relatively small diffusion angle is used in terms of a level of illumination irregularities.

Figure 17:
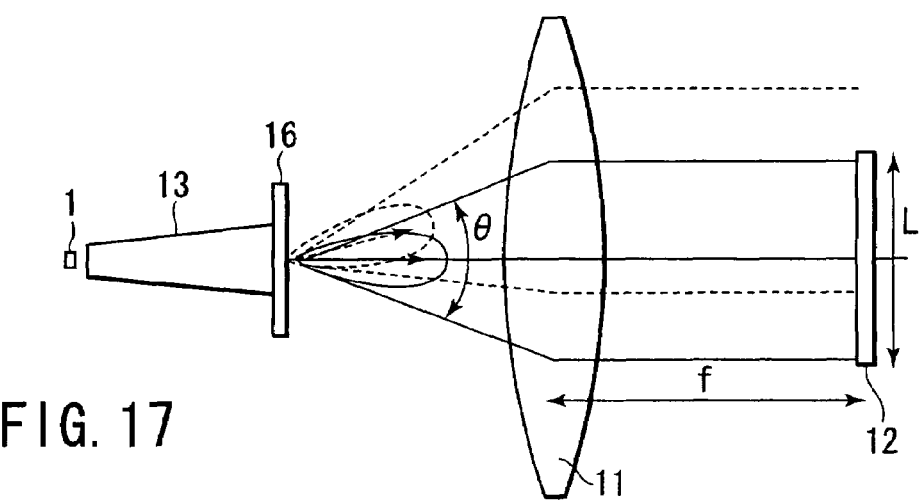
FIG. 17 is a view illustrating a diffusion angle of a diffuser.

A diffusion angle of this diffuser 16 will now be described with reference to FIG. 17. A largeness of the diffusion angle relates to a reduction in angle irregularities (reduction in illumination irregularities in regard to an illumination position) and the efficiency, the angle irregularities are reduced as the diffusion angle is larger, but the efficiency is deteriorated. In regard to a maximum diffusion angle $\theta$, assuming that a focal distance of the illumination lens 11 is f, a degree that the angle becomes substantially equal to an illumination area L at an illumination position is its upper limit, when the light flux vertically outgoing from the outgoing radiation end surface of the taper rod 13 has a spread of the diffusion angle $\theta$. The effect of averaging the outgoing radiation angle becomes maximum with this degree of the diffusion angle. However, when the maximum outgoing radiation angle of the original taper rod 13 corresponds to substantially $\theta$ without using the diffuser 16, a size of the pupil becomes large with respect to the illumination area by interposition of the diffuser 16, and the efficiency is considerably deteriorated, and hence a smaller value than this maximum diffusion angle is actually preferred as the diffusion angle.

Figure 18:
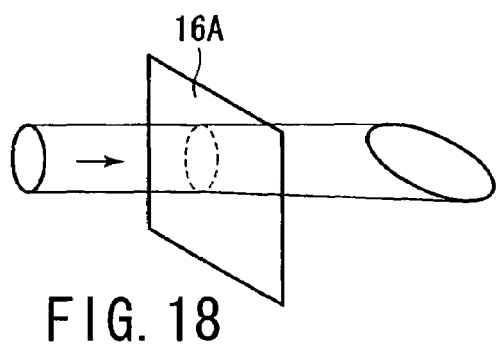
FIG. 18 is a view illustrating shape conversion from a circular light flux to an elliptic light flux by a one-dimensional diffuser.

Additionally, although the angle irregularities can be reduced by arranging the diffuser 16 on the rear stage of the taper rod 13, the efficiency can be improved by contriving the characteristics of the diffuser 16 when Koehler illumination is performed. For example, as shown in FIG. 18, by using a diffuser (one-dimensional diffuser 16A) having a diffusion angle only in the one-dimensional direction by which an elliptic light flux can be obtained upon receiving a circular light flux, the area efficiency of the illumination area can be improved when a rectangular irradiation object is subjected to Koehler illumination. As this one-dimensional diffuser 16A, there is known, e.g., a beam shaping diffuser which is on the market under the brand name of LSD5x0.2.

Figure 19:
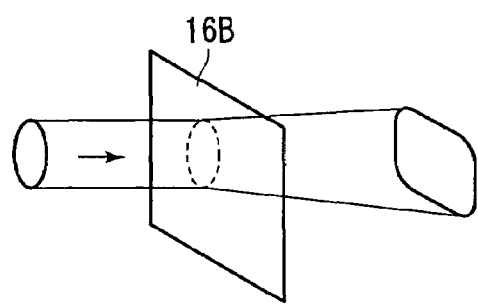
FIG. 19 is a view illustrating shape conversion from a circular light flux to a rectangular light flux by a light flux shape conversion diffuser.
Figure 20:
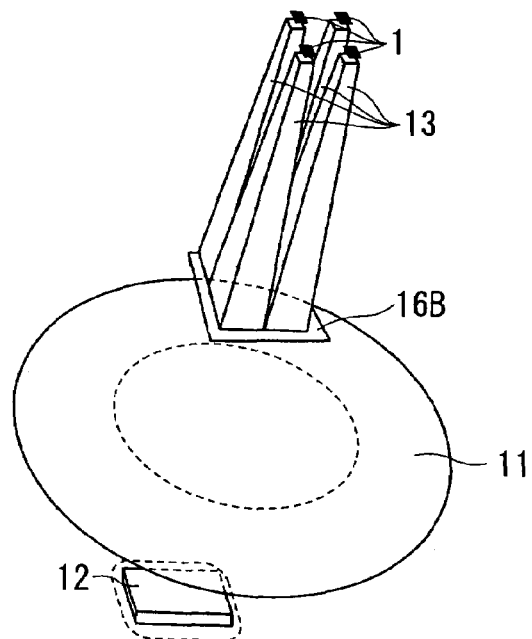
FIG. 20 is a perspective view showing a structure of an illumination apparatus using the light flux shape conversion diffuser depicted in FIG. 19.
Figure 21:
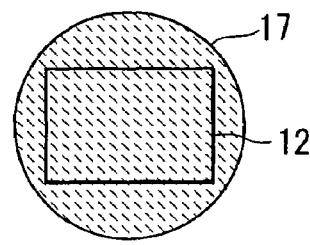
FIG. 21 is a view illustrating an illumination area when the light flux shape conversion diffuser is used.
Figure 22:
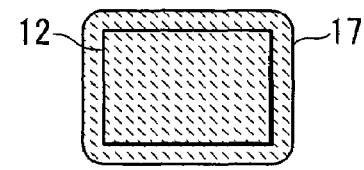
FIG. 22 is a view illustrating an illumination area when the light flux shape conversion diffuser is used.

Further, as shown in FIG. 19, the area efficiency is further improved by using a diffuser (light flux shape conversion diffuser 16B) having a light flux shape conversion function which converts a circular light flux into a rectangular light flux. In this case, when the diffusion angle is not small as described above, shading of an angle distribution becomes large, or the efficiency is deteriorated. However, when the diffusion angle is small with respect to the NA on the outgoing radiation side of the outgoing light of the taper rod, the light flux shape conversion is not sufficiently carried out, and hence it is important to increase the NA conversion effect of the taper rod and select a diffuser with an optimum diffusion angle in accordance with the balance of the shading and the efficiency. Here, a certain degree of a light path length is required in order to obtain an angular light flux. Therefore, it is preferable to arrange the light flux shape conversion diffuser 16B in the vicinity of the outgoing radiation end surface of the taper rod 13. For example, there is used an illumination apparatus having such a structure as shown in FIG. 20. By adopting the illumination apparatus having such a structure, such an illumination area 17 as shown in FIG. 21 obtained when the light flux shape conversion diffuser 16B is not used is changed into such an illumination area 17 as shown in FIG. 22 by arranging the light flux shape conversion diffuser 16B. In this case, the area efficiency is approximately 60% in case of FIG. 21, but it is increased to approximately 80% in case of FIG. 22.

It is to be noted that the light flux shape conversion diffuser 16B as the light flux shape conversion element includes radiation distribution characteristics which vary depending on the horizontal direction, the vertical direction and the diagonal direction, and can separate the light flux into a rectangular shape as shown in FIG. 23 and realize conversion into an angular shape. This light flux shape conversion diffuser 16B is disclosed in, e.g., U.S. Pat. No. 5,365,354 or U.S. Pat. No. 5,534,368, and a radiation distribution control is enabled by a surface relief technique which processes a hologram pattern on a material surface of, e.g., a resin. For example, there is known a beam shaping diffuser which is on the market under the brand name of LD5x3.

By arranging the diffuser having fine irregularities randomly formed thereto on the outgoing radiation end surface of the taper rod 13 in order to approximate the pupil shape to a desired shape rather than a circular shape, the efficiency can be improved.

EIGHTH EMBODIMENT

An eighth embodiment according to the present invention will now be described. Meanwhile, when condensing the light subjected to NA conversion by the taper rod 13 onto a predetermined illumination area, if an illumination object requires oblique illumination like a case of a two-dimensional micro mirror deflecting array, a structure layout of the taper rod 13 or the illumination lens 11 must be decentered in accordance with oblique illumination. It is to be noted that the two-dimensional micro mirror deflecting array for light modulation is known from the trademark of DMD (digital micro mirror device), and it is disclosed in, e.g., Jpn. Pat. Appln. KOKAI Publication No. 11-32278 or U.S. Pat. No. 6,129,437 thereby eliminating its detailed explanation.

FIG. 24 is a view showing a structure of an image projection apparatus using the illumination apparatus according to the eighth embodiment when such oblique illumination is required. That is, an eccentric mirror 11A is used as a pupil formation member in place of the illumination lens 11, a light path is folded by the eccentric mirror 11A, and a DMD 12A as the light modulation element 12 is illuminated, thereby achieving a compact structure. In this case, there are exercised some ingenuities, e.g., arrangement of the eccentric mirror 11A in such a manner that an ON light ray and an OFF light ray of the DMD do not overlap, and an anamorphic structure is adopted so as to eliminate an eccentric aberration.

NINTH EMBODIMENT

Some variations realized when the rod is used will now be described as a ninth embodiment according to the present invention. FIG. 25 shows an illumination apparatus in which triangular prisms 18 having reflection-coated inclined planes in order to bend the optical axis are arranged on outgoing radiation end surfaces of the taper rods 13 and the light paths are folded by a prism 11B which functions as the illumination lens 11 and is constituted by free-form surfaces, thereby illuminating a thin transmission type LCD 12B as the light modulation element. In this case, each rod outgoing radiation end surface is not provided separately from the triangular prism 18, but the taper rod 13 may be processed so as to have an inclined outgoing radiation end surface, or it may have a lens shape in view of the optical system on a rear stage.

Furthermore, FIG. 26 shows an example of an illumination apparatus using a free-form surface prism 11C which is likewise constituted by free-form surfaces as the pupil formation member. In this case, a compact structure can be achieved in accordance with a layout restriction condition by folding the light paths many times.

FIG. 27 is a view showing structure of an image projection apparatus using a reflection type LCD 12 as the light modulation element 12. In this case, the illumination apparatus irradiates the reflection type LCD 12C with the illumination light by arranging a PS converter 19 on a rear stage of the taper rods 13 and further arranging a polarized beam splitter (which will be abbreviated as a PBS hereinafter) 20 between the illumination lens 11 and the reflection type LCD 12C. Moreover, the illumination lens 11 used to form an optical pupil by using a light flux NA-converted by the taper rods 13 is constituted by a tablet. Additionally, the PBS 20 is configured to reflect the light from the LED side to the reflection type LCD 20, and not to reflect the reflected light from the reflection type LCD 12C to the LED side but transmit it to the projection lens 21 side. Therefore, in the image projection apparatus using such an illumination apparatus, by displaying an image on the reflection type LCD 12C by using an electrical signal outputted from a non-illustrated drive circuit, the displayed image can be enlarged and projected on a screen 22 by using the projection lens 21 through the PBS 20.

$10^{th}$ EMBODIMENT

A $10^{th}$ embodiment according to the present invention will now be described. There has been considered a method which selects an LED 1 which has reached a predetermined position opposed to an incident end of the rod while relatively moving a plurality of LEDs 1 with respect to the rod, performs pulse lighting drive by using a lighting portion, and controls so as to sequentially switch the LEDs by a light selection control portion, thereby increasing the brightness. In this case, since a relative position relationship between the LED 1 and the rod varies with time, an outgoing light quantity of the rod also fluctuates with time. In cases where only one LED 1 is turned on in sequence, if the radiation distribution characteristics of the LED 1 are that the light quantity becomes maximum in the vertical direction which is the general radiation distribution characteristics, the light quantity to be collected to the rod reaches a peak at a position where the LED 1 is placed on the central normal line on the rod end surface, and it is reduced as the LED 1 deviates from the central position on the rod end surface. Therefore, this fluctuation with time is considerable, and this method is unsuitable when illuminating the light modulation element 12 which expresses the gradation by performing timesharing like the DMD.

Thus, in the illumination apparatus according to the 10$^{th}$ embodiment, two LEDs 1 are constantly turned on when moving the LED 1 in this manner. FIGS. 28A to 28D show the light collecting state from incident end surface of the taper rod 13 in order of FIG. 28A, FIG. 28B, FIG. 28C and FIG. 28D with time. Here, the drawings show the state that the blackened LED 1 emits the light, but it is desirable to switch the light emitting LED 1 with a timing of a state transition from FIG. 28A to FIG. 28B. In this case, since the light corresponding to approximately one and half LEDs 1 is constantly collected to the taper rod 13, the light quantity does not fluctuate much with time. Thus, an incident end surface diameter which is twofold of an LED pitch is required with respect to a direction of movement of the LED 1 or the taper rod 13. Therefore, there is used an elliptic or rectangular taper rod 13 having a diameter which is equivalent to, e.g., the LED pitch in a direction vertical to the drawing and is twofold of the LED pitch in the direction of the drawing as the movement direction.

Furthermore, since the light quantity of the taper rod with a long incident end surface in the movement direction does not fluctuate much with time as described above, when such a taper rod 13D having the same incident end surface and outgoing radiation end surface aspects as shown in FIG. 11 is used, determining the specification of the apparatus by utilizing a fact that the direction with the larger incident NA has the larger outgoing radiation NA as it stands can realize the illumination apparatus with the good productivity of the taper rod and less fluctuation with time. Moreover, in the example of the taper 13D shown in FIG. 11, the configuration that the long side of the light modulation element 12 is positioned in the same direction as the Y direction of the rod enables illumination with the good area efficiency.

11$^{th}$ EMBODIMENT

An 11$^{th}$ embodiment according to the present invention will now be described. FIG. 29A is view showing a structure of an illumination apparatus according to the 11$^{th}$ embodiment, the brightness is improved by sequentially performing pulse lighting of the LEDs 1. That is, in the illumination apparatus according to this embodiment, the LEDs 1 are arranged in the circumferential form so as to face the center, two angular light leading rod members 23 each of which is constituted by an L-shaped optical plane used to perform NA conversion as a columnar light leading member are rotated, and the LED 1 placed at a corresponding position is sequentially caused to emit the light with swiveling of the light leading rod members 23. In this case, as described in connection with the 10$^{th}$ embodiment, although it is preferable to cause each two LEDs 1 to emit the light relative to the respective light leading members 23, only one LED 1 may be caused to emit the light.

Additionally, the optical system has a Koehler illumination structure, and a light flux conversion element arranged on the outgoing radiation end surfaces of the light leading rod members 23, e.g., a light flux shape conversion diffuser 16B is used to convert a shape of a pupil formal by the illumination lens 11 into a shape close to an outer shape of the light modulation element 12. At this time, as shown in FIG. 29B, even if the outgoing radiation end surface 23a itself of the light leading rod member 23 has a rectangular shape, the light flux shape of the outgoing radiation end surface 23a is a circular shape with a trajectory of corner portions being determined as a circumference by rotation. Assuming that the outgoing radiation end surface 23a is a virtual light source and critical illumination which sets a conjugate relationship with the light modulation element 12 as an irradiation object is performed, the light quantity at the peripheral portion of the outgoing radiation end surface 23a as a physical plane fluctuates with time, which results in temporal illumination irregularities. On the other hand, in Koehler illumination, since the angle distribution of the outgoing light does not vary even if the light leading rod members 23 rotate, fluctuations in illumination intensity irregularities with time do not occur.

Figure 30:
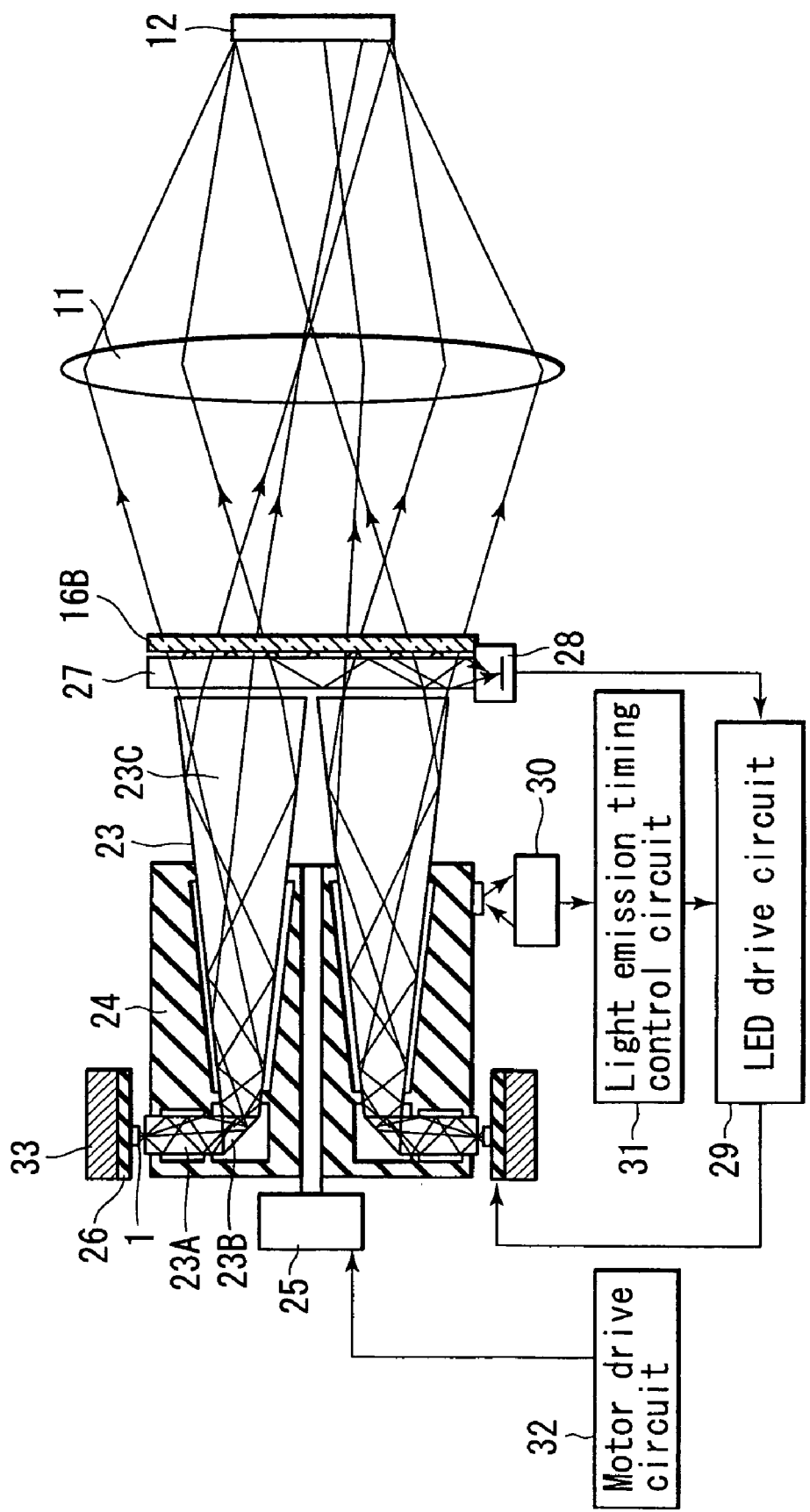
FIG. 30 is a view showing the structure of the illumination apparatus according to the $11^{th}$ embodiment in further detail.

FIG. 30 is a view showing the structure of the illumination apparatus according to the 11$^{th}$ embodiment depicted in FIG. 29A in further detail. That is each angular light leading rod member 23 constituted by an L-shaped optical plane attached to a rod holder 24 as a holder capable of swiveling is rotated by a motor 25 as a drive member, and a plurality of LEDs 1 arranged on the inner circumference of an LED substrate 26 formed into a drum shape are sequentially turned on with rotation of the light leading rod members 23. It is to be noted that each light leading rod member 23 has an angular shape because the efficiency is high due to a rectangular shape of the LED 1 and the loss generated when bending into the L shape can be minimized. Further, this L-shaped light leading rod member 23 may be manufactured by integral molding, or it may be formed by bonding three members, i.e., an angular parallel rod 23A, a reflection prism 23B having reflection-coated light path bending inclined planes and the taper rod 23C.

Furthermore, the outgoing radiation end surface of each light leading rod member 23 is used as a vertical light source, and the illumination lens 11 is used to configure a Koehler illumination optical system which forms an optical pupil on a display device as the light modulation element 12. Moreover, in order to improve the area efficiency, the light flux shape conversion diffuser 16B is arranged on the rear stage of the outgoing radiation end surfaces of the light leading rod members 23. Additionally, a part of the outgoing light is led to a light quantity monitor 28 where the light is monitored by using a light leading plate 27 arranged in the vicinity of the outgoing radiation ends of the light leading rod members 23, a drive current of the LED 1 is feedback-controlled by an LED drive circuit 29 as a lighting portion in such a manner that the light quantity becomes optimum in accordance with an increase or a decrease in the monitored outgoing light. Further, a light emission timing of the LED 1 obtained by the LED drive circuit 29 is controlled by a light emission timing control circuit 31 as a light selection control portion based on a rotation position detection of the rod holder 24 by a rotation sensor 30.

It is to be noted that the motor 25 is driven by a motor drive circuit 32. Furthermore, a heat slinger 33 is provided at the outer periphery of the drum-shaped LED substrate 26, change in characteristics of the LED 1 due to heat is prevented by radiating heat generated by light emission of the LED 1, and stable illumination can be thereby obtained even if the illumination apparatus is continuously operated.

As described above, a plurality of the LEDs 1 are sequentially switched and subjected to pulse light emission, a relative position relationship with the light leading rod members 23 which collect the emitted light is selected and shifted in accordance with light emission switching of the LEDs 1, thereby effectively obtaining the LEDs with the high brightness and acquiring the light with a high intensity and an improved parallelism from the light leading rod members 23.

Incidentally, in this structure, a relative position between the LEDs 1 and the light leading rod members 23 is shifted by rotating the light leading rod members 23, but it can be also realized by moving the LEDs 1. However, in view of power feeding to the LEDs 1, it is preferable to move the light leading members 23 in regard to the reliability. In this case, since the light intensity distribution in, e.g., the outgoing radiation end surface of each light leading rod member 23 has small irregularities when the light leading rod member 23 has a length to some extent, this outgoing radiation end surface can be regarded as a virtual rectangular top face light source with the high evenness, and hence there may be carried out critical illumination which sets the light modulation element 12 as an irradiation object and the outgoing radiation end surface of the light leading member 23 to a conjugate relationship and performs illumination. However, when a plurality of the light leading rod members 23 are provided like this structure, a peripheral edge portion of the outgoing radiation end surface of each light leading rod member 23 is projected onto the irradiation object and illuminated, which results in lack of illuminant uniformity. Since rotation is actually performed, the illumination area has a circular shape and the peripheral edge portion cannot be visually confirmed depending on a rotational speed. However, in a given moment, the peripheral edge portion of the rod outgoing radiation end surface has illumination irregularities, the illumination irregularities are shifted in the area with time, and hence this mode cannot be applied to the light modulation element 12 (display device) which expresses the gradation in a time-sharing manner. On the contrary, like this structure, in case of Koehler illumination which converts an angle intensity distribution of a light flux emitted from each light leading rod member 23 into a position intensity distribution in an illumination area, even if the light leading rod member 23 is shifted, the angle intensity distribution of the light flux outgoing from the light leading rod member 23 does not vary, thereby realizing the illumination apparatus with small illumination irregularities in the illumination area.

Figure 31:
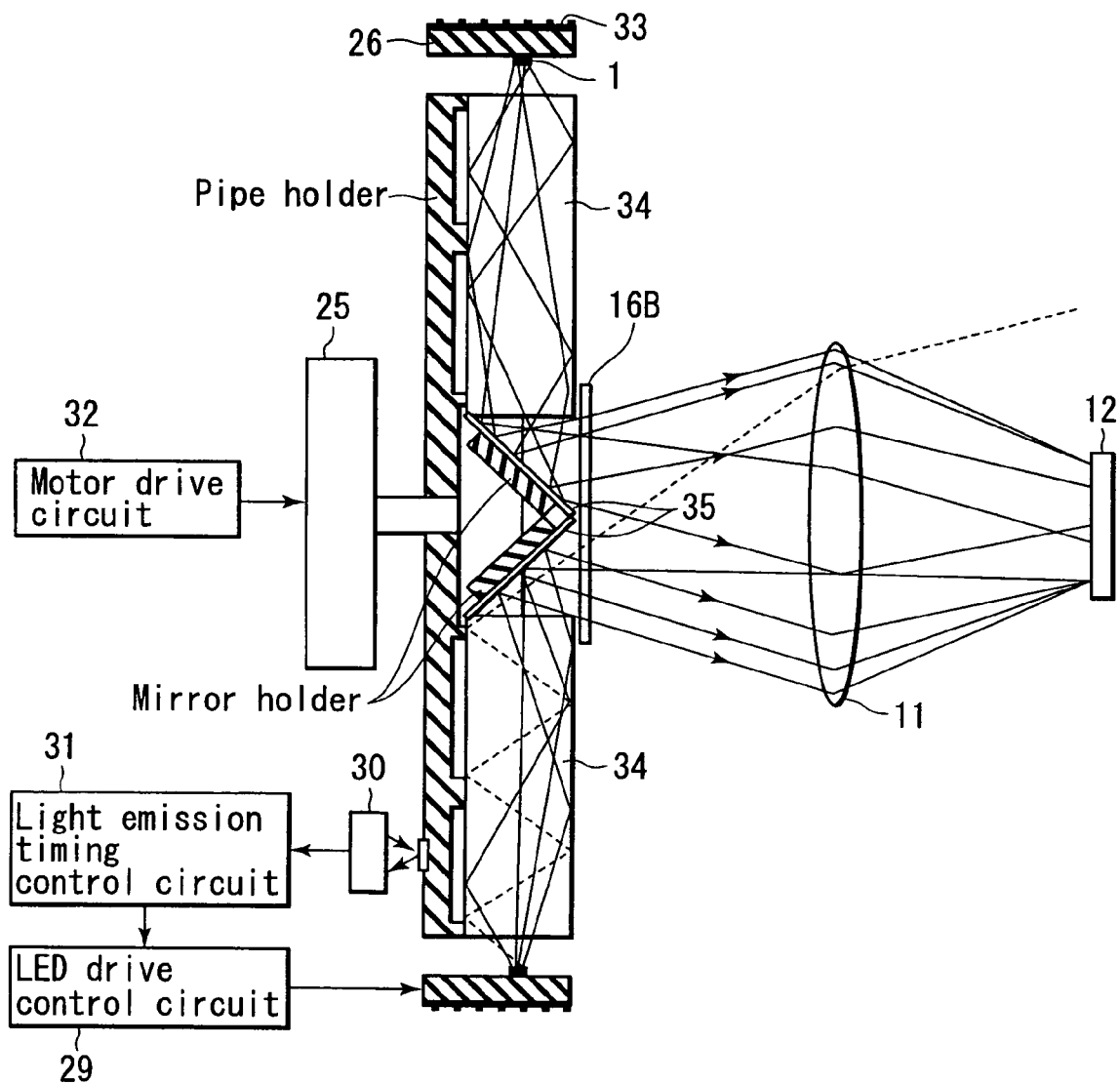
FIG. 31 is a view showing a structure of a modification of the illumination apparatus according to the $11^{th}$ embodiment.

FIG. 31 shows a modification of the illumination apparatus according to this embodiment. In this modification, the light from the LED 1 as a luminous body is reflected and led by angular light pipes 34 each having an inner surface subjected to reflecting mirror finishing in place of the rod, a direction of the optical axis is changed by a reflection mirror 35, and the light is led in such a manner that light rays from a plurality of the light pipes 34 are aligned on the light flux shape conversion diffuser 16B. In this modification, the LED 1 is fixedly set in view of power feeding, and the light pipes 34 as the light leading members and the reflection mirror 35 swivel. Moreover, since Koehler illumination is performed, even if a relative position between the light source and the pipe end surface is shifted, an illumination area is not shifted. Since the light pipes 34 do not perform the NA conversion but just lead the light, the light with a large NA indicated by dotted line reaches a position which deviates from an irradiation object. Therefore, this modification is effective for a diffusion luminous body with a relatively narrow radiation angle.

It is to be noted that a light leading plate may be likewise arranged between the reflection mirror 35 and the light flux shape conversion diffuser 16B, and a part of the outgoing light led by light leading plate may be monitored by a light quantity monitor so the a drive current of the LED 1 can be subjected to a feedback control by the LED drive circuit 29.

Although the present invention has been described based on the foregoing embodiments, the present invention is not restricted to the above-described embodiments, and various kinds of modifications or applications can be of course carried out without departing from the scope of the invention.

For example, the luminous body is not limited to the LED, and any kind of luminous body may be adopted as long as it is a small-plane light source having the diffusion radiation characteristics.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An illumination apparatus comprising:
   a small-plane light source having diffusion radiation characteristics;
   a columnar light leading member, having an incident end surface, an outgoing radiation end surface and a reflection surface, configured to reflect on the reflection surface at least a part of a light ray from the small-plane light source collected from the incident end surface, thereby leading the light to the outgoing radiation end surface; and
   an angle position converting member configured to convert an outgoing light angle intensity of the outgoing light from the outgoing radiation end surface of the columnar light leading member into a position intensity in a predetermined irradiation area, wherein a distance between the angle position converting member and the predetermined irradiation area is substantially equal to a focal distance of the angle position converting member;
   the angle position converting member including a pupil forming member configured to form a pupil by using the outgoing radiation end surface of the columnar light leading member as a virtual light source,
   a position of the irradiation area is set in the vicinity of a position of a pupil formed by the pupil forming member; and
   a light diffusion element arranged on a rear stage of the outgoing radiation end surface of the columnar light leading member.

2. The apparatus according to claim 1, wherein, when the pupil forming member has a focal distance f and a size of the irradiation area is L, a diffusion angle $\theta$ of the light diffusion element satisfies the following expression:
   $-2 \times \mathrm{Tan}^{-1}(0.5 \times L/f) < \theta < 2 \times \mathrm{Tan}^{-1}(0.5 \times L/f)$.

3. The apparatus according to claim 1, wherein the light diffusion element includes a one-dimensional diffuser.

4. An illumination apparatus comprising:
   a small-plane light source having diffusion radiation characteristics;
   a columnar light leading member, having an incident end surface, an outgoing radiation end surface and a reflection surface, configured to reflect on the reflection surface at least a part of a light ray from the small-plane light source collected from the incident end surface, thereby leading the light to the outgoing radiation end surface; and an angle position converting member configured to convert an outgoing light angle intensity of the outgoing light from the outgoing radiation end surface of the columnar light leading member into a position intensity in a predetermined irradiation area, wherein a distance between the angle position converting member and the predetermined irradiation area is substantially equal to a focal distance of the angle position converting member;

the angle position converting member including a pupil forming member configured to form a pupil by using the outgoing radiation end surface of the columnar light leading member as a virtual light source, a position of the irradiation area being set in the vicinity of a position of a pupil formed by the pupil forming member; and wherein the pupil forming member is arranged so as to be eccentric with respect to a normal line of the outgoing radiation end surface of the columnar light leading member.

5. The apparatus according to claim 4, wherein the pupil forming member includes a prism having free-form surfaces.

6. An image projection apparatus comprising:
an illumination apparatus comprising:
  a small-plane light source having diffusion radiation characteristics;
  a columnar light leading member, having an incident end surface, an outgoing radiation end surface and a reflection surface, configured to reflect on the reflection surface at least a part of a light ray from the small-plane light source collected from the incident end surface, thereby leading the light to the outgoing radiation end surface; and
  an angle position converting member configured to convert an outgoing light angle intensity of the outgoing light from the outgoing radiation end surface of the columnar light leading member into a position intensity in a predetermined irradiation area;
a light modulation element, having a pixel structure, configured to modulate a light ray for each pixel in accordance with an image signal; and
a projection lens configured to enlarge and project the light modulation element, wherein
the light modulation element is arranged in the illumination area in the illumination apparatus and the distance between the outgoing radiation end surface and the angle position converting member and the distance between the angle position converting member and the light modulation element are substantially equal;
the angle position converting member including a pupil forming member configured to form a pupil by using the outgoing radiation end surface of the columnar light leading member as a virtual light source, and
a position of the irradiation area is set in the vicinity of a position of a pupil formed by the pupil forming member; and further comprising a light diffusion element arranged on a rear stage of the outgoing radiation end surface of the columnar light leading member.

7. The apparatus according to claim 6, wherein, when the pupil forming member has a focal distance f and a size of the irradiation area is L, a diffusion angle θ of the light diffusion element satisfies the following expression:

$-2 \times \mathrm{Tan}^{-1}(0.5 \times L/f) < \theta < 2 \times \mathrm{Tan}^{-1}(0.5 \times L/f)$.

8. The apparatus according to claim 6, wherein the light diffusion element includes a one-dimensional diffuser.

9. An image projection apparatus comprising:
an illumination apparatus comprising:
  a small-plane light source having diffusion radiation characteristics;
  a columnar light leading member, having an incident end surface, an outgoing radiation end surface and a reflection surface, configured to reflect on the reflection surface at least a part of a light ray from the small-plane light source collected from the incident end surface, thereby leading the light to the outgoing radiation end surface; and
  an angle position converting member configured to convert an outgoing light angle intensity of the outgoing light from the outgoing radiation end surface of the columnar light leading member into a position intensity in a predetermined irradiation area;
a light modulation element, having a pixel structure, configured to modulate a light ray for each pixel in accordance with an image signal; and
a projection lens configured to enlarge and project the light modulation element, wherein
the light modulation element is arranged in the illumination area in the illumination apparatus and the distance between the outgoing radiation end surface and the angle position converting member and the distance between the angle position converting member and the light modulation element are substantially equal;
the angle position converting member including a pupil forming member configured to form a pupil by using the outgoing radiation end surface of the columnar light leading member as a virtual light source, and
a position of the irradiation area being set in the vicinity of a position of a pupil formed by the pupil forming member; and
wherein the pupil forming member is arranged so as to be eccentric with respect to a normal line of the outgoing radiation end surface of the columnar light leading member.

10. The apparatus according to claim 9, wherein the pupil forming member includes a prism having free-form surfaces.

* * * * *